United States Patent [19]

Fagerburg et al.

[11] Patent Number: 4,482,588
[45] Date of Patent: Nov. 13, 1984

[54] BONDING COMPOSITIONS AND SHAPED ARTICLES UTILIZING THE BONDING COMPOSITIONS

[75] Inventors: David R. Fagerburg; Freddie A. Shepherd, both of Kingsport; Benny W. Wright, Bluff City; I. Daniel Sand, Kingsport, all of Tenn.

[73] Assignee: Eastman Kodak Company, Rochester, N.Y.

[21] Appl. No.: 496,345

[22] Filed: May 19, 1983

[51] Int. Cl.³ ................ B65D 3/00; B32B 27/10; C08F 12/30
[52] U.S. Cl. .................... 428/35; 428/475.2; 428/476.9; 428/480; 528/288
[58] Field of Search ............ 428/480, 483, 910, 35, 428/36, 542.8, 515, 475.5, 475.8; 528/288, 272

[56] References Cited

U.S. PATENT DOCUMENTS

| | | | |
|---|---|---|---|
| 3,479,425 | 11/1964 | Lefeure et al. | 264/171 |
| 3,546,178 | 12/1970 | Caldwell et al. | 528/288 |
| 3,557,265 | 1/1971 | Chisholm et al. | 264/171 |
| 3,849,514 | 12/1974 | Gray, Jr. et al. | 528/272 |
| 3,900,436 | 8/1975 | Drawert et al. | 528/288 |
| 4,079,850 | 3/1978 | Suzuki et al. | 215/1 C |
| 4,101,524 | 7/1978 | Burzin et al. | 528/288 |
| 4,116,943 | 9/1978 | Ducarre | 528/288 |
| 4,182,457 | 1/1980 | Yamada et al. | 215/1 C |
| 4,261,473 | 4/1981 | Yamada et al. | 428/35 |
| 4,343,743 | 8/1982 | Coznard et al. | 528/288 |
| 4,361,680 | 11/1982 | Borg et al. | 528/288 |
| 4,380,622 | 4/1983 | Chiba et al. | 528/288 |

FOREIGN PATENT DOCUMENTS

| | | |
|---|---|---|
| 77144 | 6/1981 | Japan . |
| 11050 | 1/1982 | Japan .................. 428/483 |
| 2061763 | 5/1981 | United Kingdom . |

*Primary Examiner*—Marion E. McCamish
*Assistant Examiner*—Beverly K. Johnson
*Attorney, Agent, or Firm*—William P. Heath, Jr.; Daniel B. Reece, III

[57] ABSTRACT

Bonding compositions for bonding polyesters or copolyesters to poly(vinyl alcohol) or copolymers thereof, the composition comprising a poly(esteramide) having an inherent viscosity of at least 0.8 dl/g, said poly(esteramide) containing repeating units from 70 to 90 mol percent of a dicarboxylic acid selected from adipic, pimelic, suberic, azelaic, sebacic acid or combinations thereof and 10 to 30 mol percent of a second linear aliphatic dicarboxylic acid having at least four carbon atoms connected linearly between the two acid groups or an aromatic dicarboxylic acid; repeating units from 10 mol percent to 30 mol percent of a diamine selected from 1,6-hexanediamine, 1,4-cyclohexanebismethylamine or combinations thereof; and repeating units from 90 to 70 mol percent of a glycol selected from ethylene glycol, 1,4-butanediol, 1,4-cyclohexanedimethanol or combinations thereof. The repeating units from the second linear aliphatic dicarboxylic acid and repeating units from the diamine are present in equal molar amounts. Also disclosed are shaped articles comprising a polyester polymer layer and a poly(vinyl alcohol) layer, the layers being bonded together with bonding compositions of this invention.

18 Claims, No Drawings

BONDING COMPOSITIONS AND SHAPED ARTICLES UTILIZING THE BONDING COMPOSITIONS

DESCRIPTION

1. Technical Field

This invention relates to poly(esteramide) bonding compositions and shaped articles comprising polyester inner and outer layers, poly(vinyl alcohol) or copolymers thereof as a barrier layer and tie layers of the bonding compositions. The articles are characterized by greatly improved gas barrier properties.

2. Background Art

U.S. Pat. No. 4,261,473 discloses multilayer structures useful as packaging materials. Particularly, this patent discloses molded containers having a barrier layer interposed between layers of a thermoplastic polyester resin. The barrier layer typically is a blend of polymers such as ethylene-vinyl alcohol copolymer and polyethylene terephthalate or a polyamide polymer. These containers may be fabricated from a coextruded pipe of five layers comprising for example a resin outer layer, an adhesive layer, a barrier layer, an adhesive layer and a resin inner layer (see Example 5).

U.S. Pat. No. 3,595,740 discloses laminar film structures comprising a thermally formable base layer, a barrier layer of a hydrolyzed copolymer from ethylene-vinyl acetate and a heat sealable layer. Also disclosed is the use of certain adhesive compositions to tie the layers together (see Column 3, line 55+).

U.S. Pat. No. 3,849,514 discloses block polyester-polyamide copolymers which are reported to be useful as adhesive among many other uses. The block polyester-polyamide copolymers encompass such polymers made from any aliphatic, alicyclic, and aromatic difunctional diamine; any aliphatic, alicyclic, and aromatic dicarboxylic acid or esters thereof; and aliphatic, alicyclic, and aromatic diols.

DISCLOSURE OF THE INVENTION

This invention includes bonding compositions for bonding polyesters or copolyesters to poly(vinyl alcohol) or copolymers thereof, the composition comprising a poly(esteramide) having an inherent viscosity of at least 0.8 dl/g, said poly(esteramide) containing repeating units from 70 to 90 mol percent of a dicarboxylic acid selected from adipic, pimelic, suberic, azelaic, sebacic acid or combinations thereof and 10 to 30 mol percent of a second linear aliphatic dicarboxylic acid having at least four carbon atoms connected linearly between the two acid groups or an aromatic dicarboxylic acid; repeating units from 10 mol percent to 30 mol percent of a diamine selected from 1,6-hexanediamine, 1,4-cyclohexanebismethylamine or combinations thereof; and repeating units from 90 to 70 mol percent of a glycol selected from ethylene glycol, 1,4-butanediol, 1,4-cyclohexanedimethanol or combinations thereof. The repeating units from the second linear aliphatic dicarboxylic acid and repeating units from the diamine are present in equal molar amounts. It is preferred that the repeating units from adipic, pimelic, suberic, azelaic or sebacic acid be present in the amount of 75 to 85 mol percent. Also it is preferred that the repeating units from a diamine are present in the amount of 15 to 25 mol percent. It is more preferred that the repeating units from a diamine be from 1,6-hexanediamine in the amount of 15 to 25 mol percent. It is preferred that the repeating units from a glycol be from 1,4-butanediol and be present in the amount of 85 to 75 mol percent.

This invention includes shaped articles comprising a polyester polymer layer and a poly(vinyl alcohol) layer, the layers being bonded together with bonding compositions of this invention. It is preferred that the poly(vinyl alcohol) layer be an ethylene-vinyl alcohol copolymer having an ethylene content of 30 to 50 mol percent. The shaped article may be an oriented film or an oriented bottle.

The invention includes oriented beverage bottles comprising an outer layer of poly(ethylene terephthalate), a barrier layer of an ethylene-vinyl alcohol copolymer, and an inner layer of poly(ethylene terephthalate), the respective layers being bonded together by tie layers of the bonding composition of this invention disposed between the outer layer and the barrier layer and the inner layer and the barrier layer.

The invention further includes a coextruded tubular structure comprising an outer layer of poly(ethylene terephthalate), a barrier layer of ethylene-vinyl alcohol copolymer and an inner layer of poly(ethylene terephthalate), the layers being bonded together by a tie layer of the composition of this invention disposed between the outer layer and the barrier layer and the inner layer and the barrier layer. The tubular structure may be formed into a parison or preform for blowing beverage bottles.

The polyester polymers suitable for this invention include poly(ethylene terephthalate) and modifications thereof with aliphatic glycols containing from 3 to 12 carbon atoms. These may be either linear or branched and may contain ring structures. Examples of especially useful modifying glycols are 1,4-butanediol, 1,6-hexanediol, 1,4-cyclohexanedimethanol, and neopentyl glycol. The poly(ethylene terephthalate) may also be modified with diacids. Aliphatic and aromatic diacids may be used. Especially useful as a modifying diacid is isophthalic acid.

Generally, either the diol or diacid modifier may be used at up to about 50 mol % but the most useful materials are those where orientation can be developed by deforming heated articles, thereby restricting the useful modification level to about 15 mol % and below.

Other polyesters or copolyesters may be used in this invention besides poly(ethylene terephthalate). A particularly useful group of copolyesters is the one based on 1,4-cyclohexanedicarboxylic acid, 1,4-cyclohexanedimethanol, and poly(tetramethylene oxide) glycol as described in U.S. Pat. No. 4,349,469.

Other useful polyesters are poly(1,4-cyclohexylenedimethylene terephthalate) and copolymers thereof with aliphatic diols of 2 to 12 carbon atoms or aliphatic or aromatic diacids as described above.

The vinyl alcohol polymers useful in this invention include those wherein the olefin content of the copolymer is between about 7 and about 50% mol percent and the residual ester content of the vinyl alcohol portion is below 3.0%. It is preferred that the differential thermal analysis curve for the copolymer be a single narrow endotherm having a melting range of less than 30° C. Also, the olefin content of the copolymer should be maintained within a narrow distribution range and significant amounts of homopolymer segments of either olefin or vinyl alcohol should be avoided.

The olefin distribution range and the presence of homopolymers is most conveniently measured using differential thermal analysis (DTA) techniques. The differential thermal analysis (DTA) is carried out according to the procedure set forth by D. A. Vassalo and J. C. Harden in Analytical Chemistry, Volume 34, January, 1962, pages 132–135, using a Du Pont 900 Differential Thermal Analyzer programmed at a 30° C./minute rate. A DTA curve wherein the curve is characterized by a single narrow melting endotherm having a range of less than 30° C. indicates a narrow olefin distribution in the copolymer.

An example of the preparation of a preferred ethylene-vinyl alcohol copolymer is as follows.

Vinyl acetate monomer (1250 grams) is charged to a one-gallon stainless steel autoclave equipped with an internal cooling coil and agitation means. The vessel and contents are cooled to 15° C. by circulating cold water in the cooling coil. Solid isopropyl percarbonate (1.125 grams) is added to 1250 grams of vinyl acetate previously cooled to −40° C. The percarbonate dissolves readily with gentle agitation and the solution is then poured into the autoclave. The autoclave is pressurized while maintaining agitation, with 100 psig (7.03 kg/cm² gage) ethylene and then vented to zero psig (atmospheric pressure). The autoclave is purged twice again in the same manner in order to remove any oxygen from the autoclave and its contents. Then the reaction temperature is increased to 45° C. by means of an external electrical heating mantle; the pressure is 100 psig (7.03 kg/cm²) before heating and additional ethylene is added to bring the pressure to 450 psig (31.6 kg/cm²) simultaneously with the temperature rise to 45° C. The reaction temperature is controlled between 45° C. and 46° C. The autoclave is vented several times during the run in order to maintain a constant pressure of 450 psig (31.6 kg/cm²). The cooling of the monomer and the simultaneous increase in temperature and pressure is carried out to avoid any premature polymerization that would result in any homopolymer segments. After four hours reaction time a monomer conversion of 35.8% is achieved and the autoclave contents are cooled rapidly to 20° C. without venting of pressure and the contents are dumped into two volumes of methanol containing 0.1% by weight of inhibited styrene monomer which process acts to rapidly quench the polymerization process and avoid residual polymerization that may produce segments of homopolymer. The ethylene-vinyl acetate resin is recovered within 24 hours by disintegration of the varnish into several volumes of hexane. The resin, which is dried overnight at 75° C., has an ethylene content of 32 mol percent and a viscosity number of 0.763 dl/g in toluene (0.25 g/100 ml) at 25° C.

The foregoing ethylene-vinyl acetate polymer is hydrolyzed to form ethylene-vinyl alcohol polymer having less than 3% residual vinyl acetate groups. The hydrolysis is carried out using a 4% by weight solution of sodium hydroxide in methanol according to the procedures well known to those skilled in the art.

The hydrolyzed ethylene-vinyl alcohol resin has a viscosity number of 1.414 dl/g in dimethyl sulfoxide (0.25 g/100 ml) at 25° C.

A differential thermal analysis (DTA) curve of the hydrolyzed polymer shows a single narrow melting endotherm (DTA) having a range of 15° C. with a minimum at 177° C. The narrow endotherm indicates that the ethylene-vinyl alcohol polymer has a narrow ethylene distribution, i.e., the individual chain segments that make up the polymer mass have a narrow ethylene distribution around a mean which is the total amount of ethylene in the copolymer. The single melting endotherm indicates that the polymer does not have significant amounts of homopolymer in the resin.

Suitable vinyl esters which can be copolymerized with the olefin comonomers and subsequently hydrolyzed to form the olefin-vinyl alcohol copolymers of this invention include vinyl ester monomers of the general formula

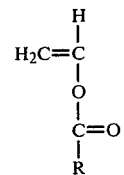

wherein R is selected from the group comprising hydrogen, alkyl groups of from 1 to 10 carbon atoms, aryl groups of from 6 to 10 carbon atoms including the carbon atoms in ring substituted alkyl substituents, e.g., vinyl formate, vinyl acetate, vinyl propionate, vinyl butyrate, vinyl benzoate, and the like. Preferably, the vinyl ester is vinyl acetate.

The preferred olefin-vinyl alcohol materials are ethylene-vinyl alcohol copolymers and wherein the olefin content is from 7 to 50 mol percent based on the weight of the copolymer. The residual ester content of the copolymer should be less than 3% and preferably less than 2% by weight. Most preferably the residual ester content is less than 1% by weight. The preferred ethylene-vinyl alcohol copolymer resins will contain less than 2% homopolymers. Especially preferred are homopolymers with less than 1% homopolymer. An example of a preferred copolymer is EVAL F (trademark) resin marketed by Kuraray Company.

In the preparation of the preferred copolymers, the ethylene and the vinyl ester are polymerized in the presence of a free radical initiator to a conversion of from 20 to 70% at temperatures between −50° C. and 100° C.

The choice of initiator system is based on the necessity for minimizing chain transfer reactions such as hydrogen abstraction; solubility in the polymerization medium; and a half-life for radical generation generally between 0.1 to 100 hours and preferably between 0.5 and 5 hours. These initiators considerations are well known to those skilled in the art and need no further discussion here.

Examples of suitable initiators that meet the above requirements include the alkyl boranes such as triethyl borane, tripropyl borane, tributyl borane, etc. Tributyl borane is especially prefereред for polymerization at subambient temperatures. Also included are azobis compounds such as azobisisobutyronitrile; organic and inorganic peroxy and hydroperoxy compounds such as salts of persulfuric acid, benzoyl peroxide, isopropyl percarbonate, hydrogen peroxide, etc., the so-called redox combinations suc as t-butylhydroperoxide/sodium formaldehyde sulfoxalate, etc.

Organic solvent, which may also be included in the polymerization charge, has the advantage of tending to increase the ethylene content of the polymer for a given polymerization pressure. Solvents are also useful for limiting the molecular weight achieved during polymerization. For this reason solvents are not used at all when it is desired to maximize molecular weight. For example, only 1% of methanol on the charge causes a significant reduction in polymer molecular weight. Examples of suitable solvents include alcohols, ketones, esters, aromatic hydrocarbons, etc.

In order to obtain a copolymer suitable for use in this invention, wherein the copolymer has a narrow range of olefin distribution and has no significant amounts of homopolymer, certain critical steps in the polymerization process must be observed. An outline of these steps is set forth below.

1. Monomer conversion should be held to amounts in the range of from 1 to 70% conversion with 5 to 45% being the preferred range.
2. Prior to and during the polymerization reaction, the reactor system and reactants, solvents, should be purged free of oxygen.
3. Conditions which would permit polymerization prior to the stabilization reaction temperature and olefin pressure or during the recovery step should be avoided.
4. A constant temperature and constant olefin pressure should be maintained during the polymerization reaction. In this regard the temperature should be maintained within ±5° C. and the olefin pressure with ±5% of the pressure specified for any given system.

Such olefin-vinyl alcohol polymers and their preparation are known in the art. See, for example, U.S. Pat. No. 3,585,177, the specification of which is incorporated herein by reference.

The poly(esteramides) of this invention are elastomeric in nature, possessing both soft phase and hard phase material. The polymers contain repeating units from 70 to 90 mol percent of a dicarboxylic acid selected from adipic, pimelic, suberic, azelaic, sebacic acid or combinations thereof and 10 to 30 mol percent of a second linear aliphatic dicarboxylic acid having at least four carbon atoms connected linearly between the two acid groups or an aromatic dicarboxylic acid; repeating units from 10 mol percent to 30 mol percent of a diamine selected from 1,6-hexanediamine, 1,4-cyclohexanebismethylamine or combinations thereof; and repeating units from 90 to 70 mol percent of a glycol selected from ethylene glycol, 1,4-butanediol, 1,4-cyclohexanedimethanol or combinations thereof. The repeating units from the second linear aliphatic or aromatic dicarboxylic acid and repeating units from the diamine are present in equal molar amounts.

The diamines useful in the production of the poly(esteramides) of this invention are restricted to 1,6-hexanediamine, and 1,4-cyclohexanebismethylamine. The diacid must be adipic, pimelic, suberic, azelaic or sebacic at 70 to 90 mol percent. The remaining portion of the diacid (which is used to make the amide segment) may be a linear aliphatic dicarboxylic acid or an aromatic dicarboxylic acid. Aliphatic dicarboxylic acids may have no fewer than four carbon atoms connected linearly between the two acid groups. Acids such as adipic, suberic, sebacic, and 1,12-dodecanedioic acid, and 1,4-cyclohexanedicarboxylic acid are preferred modifying aliphatic acids. Preferred aromatic modifying acids are terephthalic and isophthalic acids.

Useful glycols are ethylene glycol, 1,4-butanediol, and 1,4-cyclohexanedimethanol and mixtures thereof. Preferred is the use of one of these glycols as the sole glycol. Preferred as such sole glycols are 1,4-butanediol and 1,4-cyclohexanedimethanol.

These diols, in combination with the allowed diacid, result in a low melting polyester segment having a low glass transition temperature. This overall combination of a crystalline polyamide and low Tg polyester gives poly(esteramides) that are elastomeric in nature.

The inherent viscosity of the poly(esteramide) must be at least about 0.8 dl/g and preferably at least 1.0 dl/g and more preferably at least 1.1 dl/g. The exact I.V. above 0.8 dl/g needed is actually determined generally by the desired polymer melt viscosity. In general, the melt viscosity of the poly(esteramide) at its processing temperature should not be different from the polyester by a factor of more than about 3 for a flat film coextrusion on a feed block system or a factor of more than about 10 for a multilayer pipe or multimanifold film coextrusion.

The poly(esteramides) of this invention can be made in such a fashion as to produce some degree of blocking, i.e. deviation from ideal randomness. This is, however, not essential to obtaining useful properties for the product poly(esteramide).

The following is a generalized example of the preparation of about 0.8 mol of a poly(esteramide) of this invention.

Into a 500 mL flask is weighed 0.16 mol (for a 20 mol % diamine modification) of the desired diamine, and an equimolar amount of the modifying diacid desired, and from one-half to all of the glycol being used. The glycol excess is generally from 10 to 100 mol % depending on the glycol volatility, the higher boiling the glycol, the lower the excess needed. The reaction mixture is stirred under an inert gas blanket and heated for sufficient time at about 200° C. to cause amidization and some esterification to occur. The major diacid and any glycol not added at the start of the reaction are then added and heating is continued (usually at a higher temperature, e.g. 220° C.) to allow completion of the esterification reaction. The melt is then raised to the polycondensation temperature (e.g. 275° C.) and a vacuum applied (usually to a pressure of 21 5 torr) for sufficient time to obtain the desired molecular weight (as measured by inherent viscosity). Organo-titanates or other active metal catalysts are usually used in the above reaction to yield acceptable reaction rates. The catalyst may be added either at the reaction start or later, such as when the temperature is brought up to the second heating level. It must be added at least prior to polycondensation.

The oriented laminar films of this invention may conveniently be prepared by the methods disclosed in U.S. Pat. Nos. 3,479,425 and 3,557,265, the specifications of which are incorporated herein by reference. U.S. Pat. No. 3,479,425 discloses a method of extruding laminar film wherein a composite stream consisting of coaxial streams of plastic is provided, passed to a sheeting die wherein the coaxial stream is deformed to provide a layered sheet. U.S. Pat. No. 3,577,265 discloses a method whereby plastic film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet or film having a laminar structure.

The extruded pipe of this invention is made in a conventional manner by coextruding through a series of plate dies to sequentially overcoat the appropriate materials in such a manner that the resulting annular structure is arranged in five layers. Different relative extruder screw speeds and take-off rates permit a variety of different tubing products to be later made into preform and later to oriented bottles.

In making the five layer pipe of this invention with an A-B-C-B-A arrangement (A=polyester, B=tie layer and C=barrier layer), we split the flow of a primary 2½ inch extruder such that it could supply both the inner and outer layers (A). By use of conventional valving arrangements in the bypass line, relative control of the flow between the inner and outer layers may be obtained, thereby the thickness of the layers may be controlled. To extrude the tie layer, a 1⅛ inch Killion extruder was provided with a valved split manifold to allow deposit of the tie layer (B) on either side of the barrier layer (C). The barrier layer was extruded via a ¾ inch Killion extruder. A stacked plate die arrangement is used to form the respective layers. For example a toroidol-distribution manifold such as that disclosed in Chapter 15 of *Polymer Blends*, Volume II and entitled "Co-Extruded Multi-Layer Polymer Films and Sheets" illustrated on page 133, FIG. 34 operates using the same principal as our stacked plate die arrangement. Pipe coextrusion is an established art but usually is done with only three layers and they do not differ appreciably in relative thickness.

To produce a five-layer pipe having a wall thickness 0.150 inches the layers may be arranged as follows:

|  | Thickness, Inches | Percent of Total |
|---|---|---|
| Outer Layer | 0.072 | 48.00 |
| Tie Layer | 0.002 | 1.33 |
| Barrier Layer | 0.002 | 1.33 |
| Tie Layer | 0.002 | 1.33 |
| Inner Layer | 0.072 | 48.00 |
| Total Thickness | 0.150 | 100.00 |

The combined tie layers and barrier layers compose, in this instance, only four percent of the total structure. The five-layer pipe emerges from the die, is drawn down to approximately one inch outer diameter and then enters a conventional vacuum chamber for sizing and cooling. A 0.050 inch thick, 1⅛ inch long brass sizing sleeve equipped with a water spray ring provides the initial sizing and cooling. The structure continues, while immersed, through the vacuum tank for additional cooling. Further downstream water cooling tanks are used to reduce the pipe to near ambient temperature before pulloff and cutoff.

By varying flow of polymer to the inner and outer layers (AA), the tie layers and barrier layer (BCB) combination can be positioned to place it near the outer diameter on nearer the inner diameter of the pipe as desired. To achieve balanced cooling of pipe one may wish to move the BCB layer combination toward the inner diameter to prevent differential shrinkage and thus prevent stresses and thereby significant separating forces in the tie layers.

The pipe is cut off to predetermined lengths and the lengths are formed into preforms or parisons to be blown into bottles. The pipe may be formed into parisons using the method disclosed in U.K. Patent Specification 1,513,067 and known as the Corpoplast system. Generally the parisons are produced by a combination of steps including gripping a cold parison of tubular shape with open ends from outside intermediate to its ends, heating the ends of the parison to deformation temperature, transferring the heated parison to a die station, gripping the parison externally intermediate to its ends in the die station, deforming first one heated end to form a closed end, enclosing the other heated end in a mold defining a cavity including threads to form neck portion on the parison, moving a core into the outer open end to radially expand and to axially displace the end, and finally admitting a pressurized medium into the interior of the parison to complete the forming of the parison neck portion. The parisons or preforms may also be made by the method disclosed in U.K. Patent Application GB 2052367A.

A preferred method of blowing the bottles of this invention involves the use of a RHB-VII three-lane, two-stage reheat blowing machine designed to produce one-half liter bottles. This machine is manufactured by Cincinnati Milacron, Plastics Machinery Division of Batavia, Ohio. The machine comprises a parison or preform carrier loading unit, a preform carrier and conveyer system, a three-lane heating system, doubleacting toggle clamp unit, bottle ejection system and a programmable control system.

In this system preforms are conveyed from a floor level hopper to an unscrambler unit at the top of the machine. Here preforms are unscrambled and directed to three individual lane-loaders each capble of loading three preforms at a time. Then elevators reach up, take three preforms each (in neck-down position), and place them in carriers (once preforms are in place on the carriers they remain there until ejected as finished bottles). Carriers then advance to a quartz heating unit, the preforms pass (neck up) through the heating unit, rotating as they travel, to assure uniform heat distribution.

At the end of the heat zone, rotation stops and the preforms pass into an equilibration zone where heat in the preform walls is allowed to stabilize at the precise temperature for the blowing process. From this zone, the preforms advance to the blow station where a 75-ton toggle clamp closes the blow molds around the preforms. Stuffer noses advance to form an air seal on the top of the carrier. At the same time the center rods are inserted into the preforms and air is introduced around the rods, blowing the preforms radially and axially. When the precessing is completed, the center rods and stuffer noses retract and the blown bottles advance to the eject station. Here the bottles are released from the carriers, dropping through guide tubes into take-away equipment.

This invention can be further illustrated by the following examples of preferred embodiments thereof, although it will be understood that these examples are included merely for purposes of illustration are not intended to limit the scope of the invention unless otherwise specifically indicated.

EXAMPLES

All inherent viscosities are determined at 25° C. in 60/40 (wt/wt) phenol/tetrachloroethane (PTCE) at a concentration of 0.5 g/100 mL, and are give in units of dl/g.

1. A poly(esteramide) bonding composition was prepared as follows: 37.6 g (0.20 mol) azelaic acid, 18.6 g (0.16 mol) 1,6-hexanediamine and 57.6 g (0.64 mol) 1,4-butanediol was combined in a three-neck 500 mL round bottom flask. The flask was immersed in a metal bath held at 200° C. and the mixture stirred for one hour at 200° C. After that time 87.6 g (0.60 mol) adipic acid and an additional 57.6 g (0.64 mol) of 1,4-butanediol were added along with sufficient acetyl triisopropyl titanate to give 100 ppm in the final polymer. Heating was continued for one hour at 220° C. The melt was then polycondensed at a bath temperature of 275° C. for one hour. The resultant polymer had an I.V. of 1.123.

2. Five-layer pipe coextrusion was performed using poly(ethylene terephthalate) modified with 3.5 mol percent 1,4-cyclohexanedimethanol as the polyester layers (outer and inner), the poly(esteramide) of Example 1 as the tie layers and a copolymer of ethylene-vinyl alcohol containing 65 mol % vinyl alcohol was used as the barrier layer to form the five-layer pipe. The layers of the pipe exhibited excellent appearance and the pipe was formed into a preform. The preform was then blown into a bottle. The bottle exhibited no delamination, even when pressurized with carbonated water.

3. Pipe coextrusion was performed as in Example 2 but substituting the following poly(esteramide): poly(1,4-tetramethylene 1,8-octanedioate) modified with 20 mol % azelaic acid and 20 mol % 1,6-hexanediamine (the amide segment is made from the diamine and azelaic acid) (I.V.=1.13). Pipe from the coextrusion had excellent appearance and adhesion. Bottles blown from parisons formed from the pipe showed excellent adhesion in the bottle side wall.

4. Pipe extrusion was performed as in Example 2 but substituting the following polyesteramide: poly(1,4-tetramethylene adipate modified with 20 mol % 1,12-dodecanedioic acid and 20 mol % 1,6-hexanediamine (I.V.=0.90), (the amide segment is made from diamine and 1,12-dodecanedioic acid).

Pipe coextrusion showed good adhesion and appearance. Bottles blown from parisons formed from the pipe showed excellent adhesion in side walls.

5. A polyesteramide is prepared as in Example 1 with the following composition: poly(1,4-tetramethylene 1,12-dodecanedioate) modified with 20 mol % adipic acid and 20 mol % 1,6-hexanediamine (I.V.=1.23). The adipic acid and 1,6-hexanediamine form the amide segment of the poly(esteramide).

Pipe coextrusion gave a pipe of good appearance but marginal adhesion. Bottles blown from parisons made from the pipe showed unacceptable adhesion of the polyester and barrier polymer layers.

We claim:

1. A bonding composition for bonding polyesters and copolyesters to poly(vinyl alcohol) and copolymers thereof, said composition comprising a poly(esteramide) having an inherent viscosity of at least 0.8 dl/g, said poly(esteramide) containing (1) repeating units from at least 70 to 90 mol percent of a dicarboxylic acid selected from adipic, pimelic, suberic, azelaic, sebacic acid or combinations thereof and 10 to 30 mol percent of a second linear aliphatic dicarboxylic acid having at least four carbon atoms connected linearly between the two acid groups or an aromatic dicarboxylic acid;

(2) repeating units from 10 mol percent to 30 mol percent of a diamine selected from 1,6-hexanediamine, 1,4-cyclohexanebismethylamine or combinations thereof; and (3) repeating units from 90 to 70 mol percent of a glycol selected from ethylene glycol, 1,4-butanediol, 1,4-cyclohexanedimethanol or combinations thereof; and wherein repeating units from said second linear aliphatic dicarboxylic acid and repeating units from said diamine are present in equal molar amounts.

2. Bonding composition of claim 1 wherein said repeating units from adipic, pimelic, suberic, azelaic or sebacic acid are present in the amount of 75 to 85 mol percent.

3. Bonding composition of claim 1 wherein said repeating units from said diamine are present in the amount of 15 to 25 mol percent.

4. Bonding composition of claim 1 wherein said repeating units from a diamine are from 1,6-hexanediamine and are present in the amount of 15 to 25 mol percent.

5. Bonding composition of claim 1 wherein said repeating units from a glycol are from 1,4-butanediol and are present in the amount of 85 to 75 mol percent.

6. Shaped article comprising a polyester polymer layer and a poly(vinyl alcohol) layer, said layers being bonded together with the composition of claim 1.

7. Shaped article of claim 6 wherein said vinyl alcohol polymer is an ethylene-vinyl alcohol copolymer having an ethylene content of 30 to 50 mol percent.

8. Shaped article of claim 6 wherein said article is an oriented film.

9. Oriented shaped article of claim 6 wherein said article is a bottle.

10. Oriented shaped article of claim 6 wherein said article is a beverage bottle having an outer layer comprising poly(ethylene terephthalate) or a copolymer thereof, a barrier layer comprising a copolymer of ethylene-vinyl alcohol and an inner layer comprising poly(ethylene terephthalate) or a copolymer thereof, said layers being bonded together by tie layers of the composition of claim 1 disposed between said outer layer and said barrier layer and said inner layer and said barrier layer.

11. Shaped article of claim 6 wherein said polyester polymer layer is selected from poly(ethylene terephthalate), poly(ethylene terephthalate) modified with up to about 50 mol percent of aliphatic glycols containing 3–12 carbon atoms or up to about 50 mol percent of an aliphatic or aromatic diacid or combinations thereof.

12. Shaped article of claim 6 wherein said polyester polymer layer is modified up to about 15 mol percent of said glycols and acids.

13. Shaped article of claim 6 wherein said polyester polymer layer comprises a copolymer containing repeating units from 1,4cyclohexanedicarboxylic acid, 1,4-cyclohexanedimethanol and poly(tetramethylene oxide) glycol.

14. Shaped article of claim 6 wherein said polyester polymer layer is poly(1,4-cyclohexylenedimethylene terephthalate).

15. Shaped article of claim 14 wherein said poly(1,4-cyclohexylenedimethylene terephthalate) is modified with up to about 50 mol percent of an aliphatic diol containing 2 to 12 carbon atoms or aliphatic or aromatic diacids or combinations thereof.

16. Shaped article of claim 14 wherein said poly(1,4-cyclohexylenedimethylene terephthalate) is modified with up to about 15 mol percent of an aliphatic diol containing 2–12 carbon atoms or aliphatic or aromatic acids or combinations thereof.

17. Shaped article comprising a coextruded tubular structure having an outer layer comprising poly(ethylene terephthalate) or copolymers thereof, a barrier layer comprising a copolymer of ethylene-vinyl alcohol and an inner layer comprising poly(ethylene terephthalate) or copolymers thereof, said layers being bonded together by a tie layer of the composition of claim 1 disposed between said outer layer and said barrier layer and said inner layer and said barrier layer.

18. Shaped article of claim 11 wherein said article is a parison.

* * * * *